US006775090B2

(12) United States Patent
DuLaney et al.

(10) Patent No.: US 6,775,090 B2
(45) Date of Patent: Aug. 10, 2004

(54) ADAPTING LOGICAL TRACK ADDRESSES IN RELATION TO HEAD OFFSETS

(75) Inventors: James W. DuLaney, Oklahoma City, OK (US); Jeffery D. Andress, Oklahoma City, OK (US); Jason D. Gregg, Oklahoma City, OK (US); Wonbo Shim, Edmond, OK (US); Roy L. Wood, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 317 days.

(21) Appl. No.: 10/015,144

(22) Filed: Oct. 26, 2001

(65) Prior Publication Data

US 2002/0167752 A1 Nov. 14, 2002

Related U.S. Application Data

(60) Provisional application No. 60/274,734, filed on Mar. 9, 2001, and provisional application No. 60/274,872, filed on Mar. 9, 2001.

(51) Int. Cl.$^7$ .............................................. G11B 5/596
(52) U.S. Cl. ................................................... 360/77.02
(58) Field of Search .............................. 360/77.02, 61, 360/75, 31, 77.04, 77.08, 78.01, 54

(56) References Cited

U.S. PATENT DOCUMENTS

| | | | |
|---|---|---|---|
| 4,935,825 A | 6/1990 | Worrell et al. | |
| 5,146,571 A | 9/1992 | Logan | |
| 5,271,018 A | 12/1993 | Chan | |
| 5,367,652 A | 11/1994 | Golden et al. | |
| 5,570,332 A | 10/1996 | Heath et al. | |
| 5,859,742 A | 1/1999 | Takaishi | |
| 5,873,125 A | 2/1999 | Kawamoto | |
| 5,890,209 A | 3/1999 | Dobbek | |
| 5,969,895 A | 10/1999 | Ueda et al. | |
| 6,101,064 A * | 8/2000 | Shepherd | 360/77.08 |
| 6,105,103 A | 8/2000 | Courtright, II et al. | |
| 6,191,912 B1 * | 2/2001 | Gaertner et al. | 360/78.04 |
| 6,246,537 B1 | 6/2001 | Shirane | |
| 6,249,888 B1 | 6/2001 | Sasaki et al. | |
| 6,295,175 B1 * | 9/2001 | Tomita et al. | 360/31 |
| 6,297,926 B1 * | 10/2001 | Ahn | 360/77.04 |
| 6,320,718 B1 * | 11/2001 | Bouwkamp et al. | 360/77.04 |
| 6,631,046 B2 * | 10/2003 | Szita et al. | 360/75 |

* cited by examiner

Primary Examiner—David Hudspeth
Assistant Examiner—Fred F. Tzeng
(74) Attorney, Agent, or Firm—Fellers, Snider, et al.

(57) ABSTRACT

Method and apparatus for improving data transfer rate performance of a disc drive data handling system having a plurality of transducing heads adjacent a corresponding plurality of data recording surfaces. Concentric tracks on each of the recording surfaces are provided with a physical track address determined by servo data written to each track. Logical track addresses are assigned to the tracks by positioning a first head adjacent a selected location on the corresponding recording surface, measuring a head offset value for each of the remaining heads, and assigning the logical track addresses on each data recording surface in relation to the measured head offset values. The logical cylinders include tracks with different physical track addresses, and the tracks in each logical cylinder are nominally aligned with the heads. This reduces the need for corrective seeks after head switching within the same logical cylinder.

16 Claims, 4 Drawing Sheets

ADAPTING LOGICAL TRACK ADDRESSES IN RELATION TO HEAD OFFSETS

RELATED APPLICATIONS

This application claims priority to United States Provisional Applications Nos. 60/274,734 and 60/274,872, both filed Mar. 9, 2001.

FIELD THE INVENTION

The claimed invention relates generally to the field of data handling systems and more particularly, but not by way of limitation, to a method and apparatus for assigning logical track addresses in a disc drive.

BACKGROUND

A disc drive is a data handling system used to store digital data. A typical disc drive includes a number of rotatable magnetic recording discs which are axially aligned and mounted to a spindle motor for rotation at a high constant velocity. A corresponding array of read/write heads are supported by a rotary actuator and used to access fixed sized data blocks (sectors) on tracks of the discs to write data to and to read data from the discs.

Disc drives are provided with servo control circuitry to move the heads to the various tracks, read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI). Communications and data transfers are carried out between host and drive in accordance with the designated protocol.

The available data storage of a typical disc drive is identified at the host level in terms of a sequence of consecutively numbered logical block addresses (LBAs). Each LBA corresponds to a unique data block (sector) at a physical location within the disc stack. A present generation drive can have several million LBAs available to store data.

During a data write command in which the host device writes a computer file to the disc drive, the host operating system uses a file allocation table (FAT) to identify a corresponding number of LBAs across which the file is to be distributed. The host transfers the data to be written to a data buffer of the drive and identifies the target LBAs to which the data are to be written. The disc drive determines the physical locations of the target LBAs in terms of physical tracks and sectors, moves the appropriate head or heads to the respective tracks, and proceeds to write the data to the appropriate sectors.

A data read command is carried out in a similar fashion; once the host determines need for a previously stored computer file, the host checks the FAT to identify the LBAs in which the file is stored and instructs the disc drive to retrieve the data from the associated LBAs. The drive identifies the physical sectors associated with the target LBAs, schedules movement of the head or heads to the appropriate sectors, and transfers the data to the buffer and then on to the host.

Of particular interest is the manner in which the disc drive identifies the physical locations of the target LBAs during a read or write (data access) operation. To explain this more fully, it will be helpful to first review the manner in which tracks are defined and addressed in a typical disc drive.

Tracks are defined by servo data recorded to the discs during disc drive manufacturing. The servo data are typically arranged in a number of radially spaced apart servo data fields. Data sectors are subsequently defined in regions between adjacent servo fields during a disc drive formatting operation. The servo data fields on each track typically include a track address field that stores a physical track address (PTA) for that track, typically in Gray code format. All of the tracks at a given radius (i.e., all the tracks having the same PTA) make up a cylinder.

Logical track addresses (LTAs) are assigned to the tracks over the user data recording areas of the disc surfaces. It is common to leave relatively small guard bands of tracks near the innermost and outermost diameters of the disc surfaces to allow storage of control parameters and information as well as to provide operational margin for the drive. An exemplary LTA scheme involves assigning the first logical track address (logical track zero) to all of the tracks in a first cylinder near the outermost diameter of the discs (such as at PTA=50) and then incrementing the logical track addresses across the discs toward the innermost diameter. Thus, logical track one would correspond to physical track 51, and so on.

When an access command is received, the interface circuit consults a conversion table or otherwise performs the necessary calculations to identify head, logical track and sector for each LBA associated with the access command. The interface circuit directs the servo control circuitry to carry out a seek to the logical track.

In order to do so, the servo control circuitry converts the logical track address to a physical track address; using the example above, a command to move a selected head to logical track 0 is interpreted by the servo control circuitry to require movement of the head to physical track 50 (in terms of Gray code). The servo circuit proceeds to execute a seek to move the selected head to the target track. Once the servo control circuit reports that the head is on track, the interface circuit directs the read/write channel to read or write the data to the target sector(s) on that track.

As will be appreciated, computer files are often much larger than a single sector and a given data access operation can involve accessing multiple sectors on multiple disc surfaces. This can be especially true in high throughput sustained accesses such as video streaming. While the heads are nominally aligned, small radial offsets (variations in radial location) will typically occur from head to head due to a number of factors such as manufacturing variations, deflection during handling, etc. Thus, if a first head is over physical track 50 and a head switch is made to a second head having a −2 track offset with respect to the first head, the second head will actually be over physical track 48 when the head switch operation is completed. A two track corrective seek will be necessary to move the second head to cylinder 50 to continue the data access operation.

It is generally known in the prior art to measure head offsets and account for such during servo operation. Using the above example, if the first head is over physical track 50 and the servo circuit is directed to move the second head over physical track 60, the second head will actually need to move 12 tracks (not just 10) to get to the desired track 60, and adjustments can be made accordingly. However, during an access operation to a given logical cylinder where multiple physical tracks are sequentially accessed by different heads, knowing the head-to-head offsets does nothing to eliminate the need to proceed with small seeks after head switch operations to maintain the heads over the tracks in the selected logical cylinder.

As track densities continue to increase, the magnitudes of corrective seeks (in terms of tracks) after head switch operations will continue to increase and such seeks will generally tend to decrease effective data transfer rate performance of a disc drive. Accordingly, there is a need for improvements to address these and other limitations of the prior art.

SUMMARY OF THE INVENTION

In accordance with preferred embodiments, a data handling system (disc drive) is provided in communication with a host device. The disc drive has a plurality of transducing heads adjacent a corresponding plurality of data recording surfaces. Concentric tracks are defined on each of the recording surfaces and are provided with a physical track address determined by servo data written to each track.

Logical track addresses are assigned to the tracks by positioning a first head adjacent a selected location of the data recording surface corresponding to the first head, measuring a head offset value for each of the remaining heads, and assigning logical track addresses to the tracks on each data recording surface in relation to the measured head offset values.

In this way, each logical cylinder will tend to include tracks with different physical track addresses, but the tracks in each logical cylinder will nonetheless be nominally aligned with the heads. This reduces the need for corrective seeks after head switching within the same logical cylinder, thus improving data transfer performance of the drive.

These and various other features and advantages which characterize the claimed invention will be apparent from a reading of the following detailed description and a review of the associated drawings.

DETAILED DESCRIPTION

Figure 1:
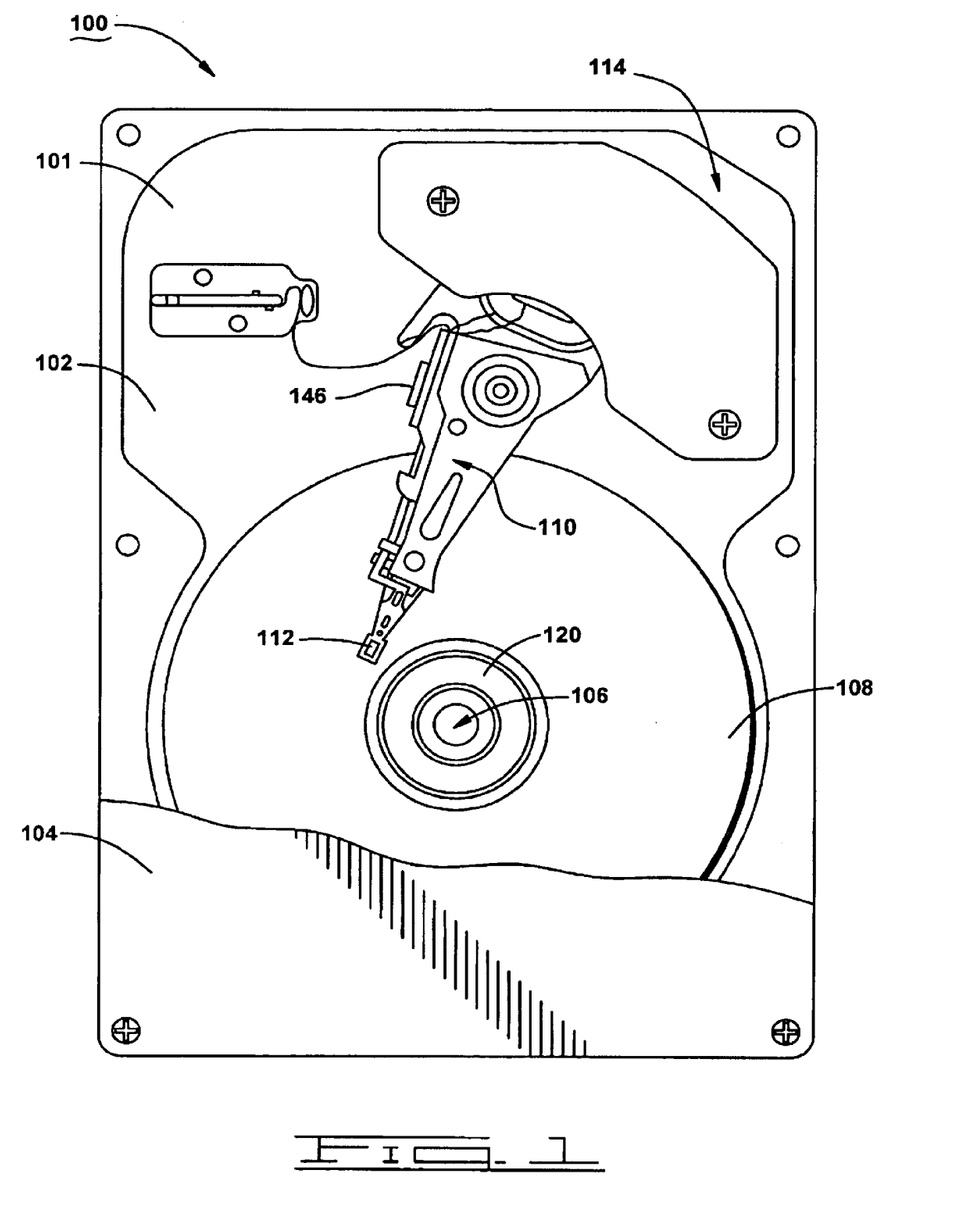
FIG. 1 is a top plan view of a disc drive data handling system constructed in accordance with preferred embodiments of the present invention.

FIG. 1 provides a top plan view of a disc drive data handling system 100 ("disc drive") constructed in accordance with preferred embodiments of the present invention. The disc drive 100 is composed of two main assemblies: a head/disc assembly (HDA) 101 and a disc drive printed circuit board. The disc drive printed circuit board is affixed to the underside of the HDA 101 and thus is not visible in FIG. 1. The HDA 101 primarily houses mechanical portions of the disc drive 100, and the disc drive printed circuit board primarily houses electrical control circuitry of the disc drive 100.

A base deck 102 and a top cover 104 (shown in partial cutaway) cooperate to form a sealed housing for the HDA 101. A spindle motor 106 rotates a number of magnetic recording discs 108 at a constant, high speed.

An actuator assembly 110 supports an array of read/write heads 112 adjacent the respective disc surfaces. The actuator assembly 110 is rotated through the application of current to an actuator motor 114 (voice coil motor, VCM). User data are stored by the heads 112 in fixed size data blocks (sectors) on concentric tracks defined on each of the disc surfaces.

Figure 2:
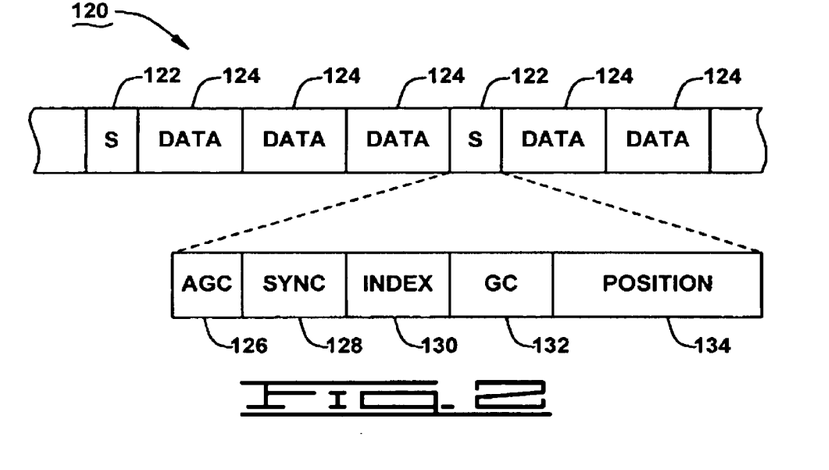
FIG. 2 illustrates the general format of a selected track on one of the disc (data recording) surfaces of the disc drive of FIG. 1.

FIG. 2 illustrates the general format of a selected track 120 from one of the disc surfaces. Servo data are provided in periodically disposed servo data fields 122 to enable servo control circuitry (not shown in FIG. 2) to detect and control head position. The servo data fields 122 are angularly spaced around the disc 108 as shown; for reference, a typical number of servo data fields 122 per track is on the order of 70–100. User data fields (sectors) 124 are subsequently defined in areas between adjacent servo data fields 122 during a disc drive formatting operation.

Each servo data field 122 has a general format as shown in FIG. 2. An automatic gain control (AGC) field 126 provides an oscillating pattern at a selected frequency and amplitude to prepare the servo control circuitry for receipt of the remaining servo data. A synchronization (sync) field 128 provides a unique pattern that identifies the presence of a servo data field 122 and indicates timing of remaining portions of the servo data.

An index field 130 indicates angular location of the servo data field 122. A Gray code (GC) field 132 provides a unique numeric physical track address (PTA) for the track; all of the servo data fields 132 on a given track have the same PTA as indicated in the respective GC fields 132. A position field 134 provides a series of offset dibit burst patterns to enable intra-track position detection and control. For a more detailed discussion of typical servo data field formats, see U.S. Pat. No. 5,262,907 issued to Duffy et al.

As will be recognized, Gray code generally comprises a multi-bit binary sequence (expressed in 0's and 1's) ordered such that only one bit changes between each pair of successive values (i.e., the Hamming distance between any successive values n and n+1 is 1). This provides a certain level of fault tolerance during operation since the disc drive can expect only one bit in the GC value to change as a particular head 112 is successively moved to each adjacent track. A conversion table is typically employed to convert the GC value to the corresponding sequential numeric value. Thus, reference herein to physical track addresses (such as physical tracks 49, 50, 51, 52, etc.) will be understood as describing the corresponding sequential numeric values and not the actual contents of the GC fields 132 on such tracks.

Figure 3:
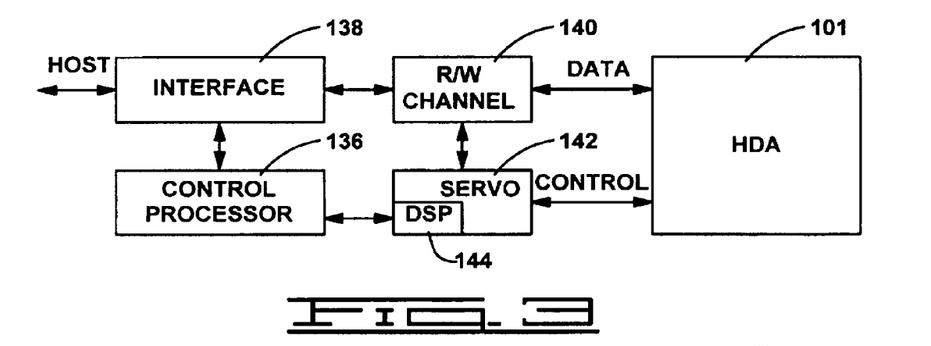
FIG. 3 is a generalized functional block diagram of control electronics of the disc drive.

FIG. 3 provides a generalized functional block diagram of the disc drive 100 to illustrate the electrical control circuitry of the disc drive printed circuit board. A programmable control processor 136 provides top level control of the operation of the disc drive 100. A host interface circuit 138 communicates with a host device (not shown) such as a personal computer in which the disc drive 100 is mounted.

The interface circuit 138 includes a data buffer for the temporary storage of transferred data, error correction circuitry for correcting errors on-the-fly during a data read operation, and a sequencer that directs the reading and writing of data. A communication (read/write, R/W) channel 140 serializes and encodes data to be written to the user data fields 124 during a write operation, and reconstructs data previously written to the user data fields 124 during a read operation. A servo control circuit 142 provides closed-loop head positional control, and includes a programmable digital signal processor (DSP) 144 and associated memory.

During operation, the servo data from the servo data fields 122 are transduced and provided to the servo control circuit 142 to indicate the current position of a currently selected head 112. The DSP 144 calculates a current adjustment signal indicative of appropriate current to apply to the VCM 114 (FIG. 1) to position the selected head 112 in a desired relation to the disc surface. Power amplifier circuitry of the servo control circuit 142 applies current to the VCM 114 in response to the current adjustment signal. The DSP 144 performs other control functions as well, such as head switching and head bias current selection through serial communication with a preamplifier/driver circuit 146 mounted to the actuator 110 (see FIG. 1).

Figure 4:
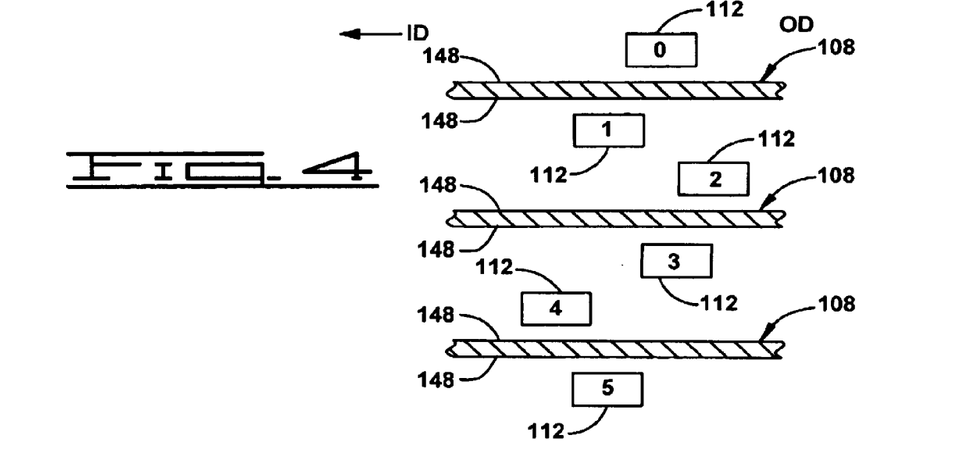
FIG. 4 is a schematic, elevational view of the disc drive illustrating head radial offsets (in an exaggerated fashion) for six heads adjacent six corresponding disc surfaces.

As discussed above, the heads 112 are individually supported adjacent the corresponding disc surfaces by the actuator 110. While the heads are intended to be nominally aligned, head offsets (variations in physical location of the heads) will often arise due to manufacturing variations, deflection due to handling, and factors. FIG. 4 provides a schematic, elevational view of six heads 112 numbered 0–5) adjacent six corresponding recording surfaces 148 of three discs 108 to illustrate such offsets. It will be understood that the relative head to head offsets in FIG. 4 have been exaggerated for clarity of illustration.

Head to head offsets can be readily measured by positioning head 0 at a selected location on the top surface 148, performing a head switch operation to activate head 1, and reading the servo data from the surface 148 adjacent head 1 to identify the position of head 1. The difference in radial position between head 0 and head 1 is assigned to head 1, and can be expressed in tracks or steps (with some number of steps provided across each track width). Remaining offsets are calculated by sequentially switching to each of the remaining heads 2–5 in turn. Exemplary offset values (in no. of tracks) corresponding to the heads 0–5 in FIG. 4 are provided in Table 1:

TABLE 1

| Head | Head to Head Offset (Tracks) | Head to Disc Offset (Tracks) |
|---|---|---|
| 0 | 0 | 0 |
| 1 | +1.5 | +1.5 |
| 2 | −3.0 | −1.5 |
| 3 | +1.0 | −0.5 |
| 4 | +3.0 | +2.5 |
| 5 | −1.0 | +1.5 |

The head to head offsets in Table 1 indicate the relative radial distance between adjacent heads, and the head to disc offsets indicate the relative radial distance for each head from a reference radial position within the disc stack (in this case, the position of head 0). Positive offsets are understood to reference a direction toward the inner diameter (ID) of the disc surface, and negative offsets reference a direction toward the outer diameter (OD), although other conventions can be used.

From Table 1 it can be seen that head 2 is offset from head 1 by a distance of −3.0 tracks, and offset from head 0 by a distance of −1.5 tracks. The head to disc offsets can be determined by integrating (summing) the head to head offsets. For purposes herein, reference to "head offsets" will be understood to describe any manner in which variation in relative head position can be expressed, whether head to head, head to disc, in terms of tracks, in terms of steps, etc.

As mentioned above, the tracks 120 on each of the disc surfaces in FIG. 4 are provided with physical track address (PTA) values determined from the GC fields 132. All of the tracks on each of the surfaces 148 having the same PTA value comprise a physical cylinder. Logical track address (LTA) values are further assigned to a subset of the tracks over the recording portion of each of the surfaces 148. By way of illustration, if each recording portion of each surface is 60,000 tracks in width, then each disc surface is assigned LTAs from LTA(0) to LTA(59,999). Preferably, LTA(0) is located toward the OD and LTA(59,999) is located toward the ID on each of the disc surfaces, although other configurations can be used as well.

When the interface circuit 138 directs a data access operation, instructions are passed to the DSP 144 to perform an appropriate head switch (as required) and seek operation to move the selected head 112 to the logical track corresponding to the designated LTA. The DSP 144 converts the LTA to the associated PTA and uses the GC data transduced from the disc 108 as the newly selected head 112 is swept across the associated surface to control movement of the head to the target track.

Figure 5:
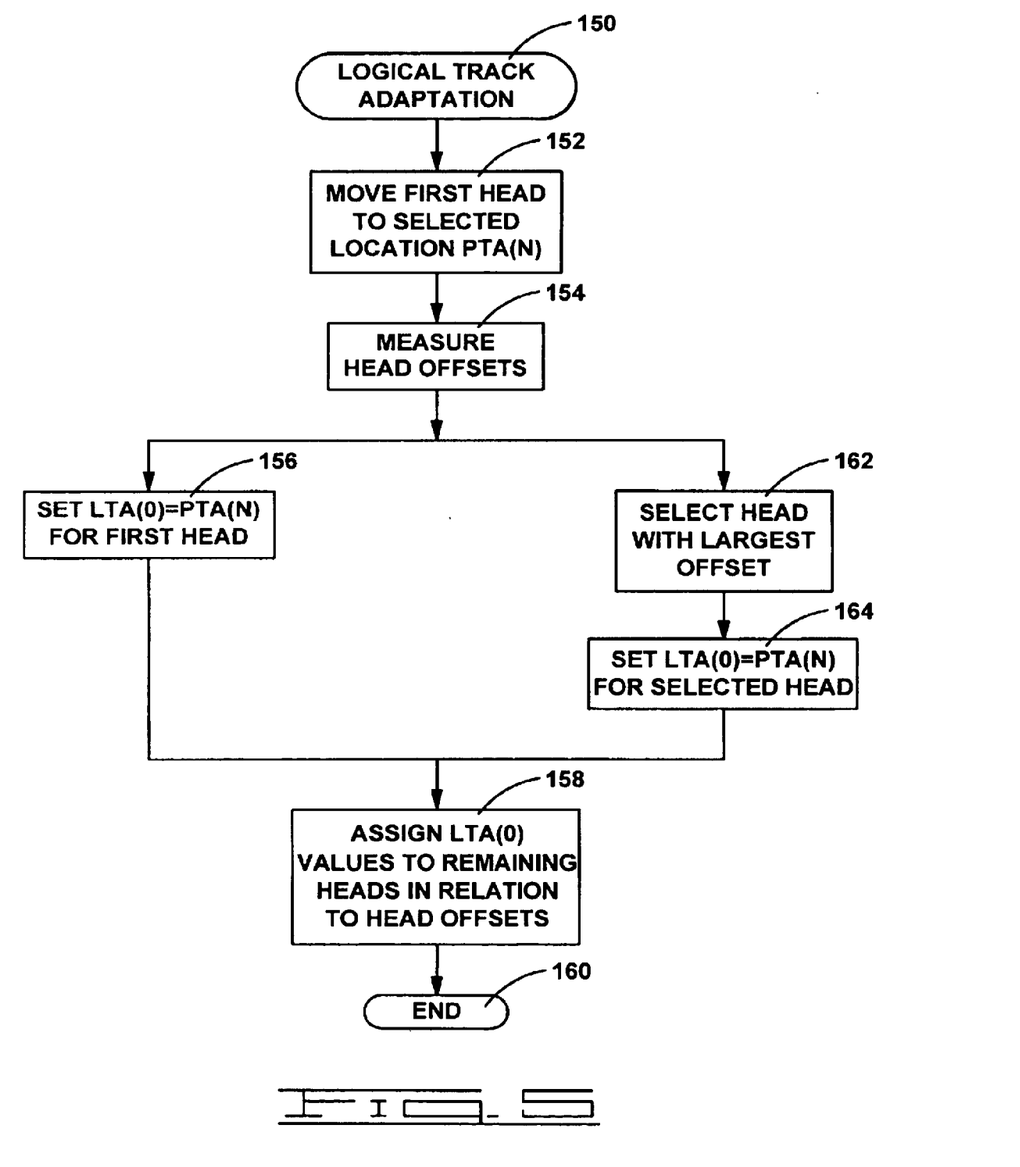
FIG. 5 is a flow chart for a LOGICAL TRACK ADAPTATION routine, illustrative of steps carried out in accordance with preferred embodiments to improve disc drive performance by assigning logical track addresses in relation to head to head offsets.

If the LTAs match the same PTAs on each of the data recording surfaces, then corrective seeks will be required after each head switch to keep the heads 112 over the same logical cylinder. Such seeks will tend to decrease the effective data transfer rate of the disc drive 100. Hence, FIG. 5 provides a flow chart for a LOGICAL TRACK ADAPTATION routine 150, generally illustrative of steps carried out in accordance with preferred embodiments to assign LTAs in relation to the various offsets among the heads 112 in order to reduce the need for such corrective seeks. The routine preferably comprises programming stored in DSP memory and used by the DSP 144 during disc drive manufacturing.

The routine commences at step 152 with the movement of a first head (such as head 0) to a selected location on the corresponding data recording surface 148. The selected location is denoted as PTA(N), which indicates a physical track address of number N. Preferably, the selected location is near a desired location for logical track 0 (LTA(0). For purposes of the present discussion, it will be contemplated that the selected location is at physical track 50 (i.e., PTA(N)=PTA(50), with physical track 50 near the outermost diameter of the discs Once the first head is at the selected location, head offsets are measured at step 154, resulting in the accumulation of data such as provided in Table 1. At this point the routine 150 branches into two alternative paths. In the first path, the routine passes from step 152 to step 156 wherein logical track zero (LTA(0)) for the first head 112 is assigned to the selected location PTA(N). In the present example, LTA(0) for head 0 would be assigned to PTA(50). It will be noted that while in preferred embodiments the logical track address assigned to the selected location is logical track zero (LTA(0)), such is not limiting; any selected logical track address M can readily be assigned to the selected location. Thus, it will be contemplated for purposes of the present discussion that M=0.

The routine then passes to step 158 wherein logical track zero (LTA(0)) values are assigned for the remaining heads 1–5 in relation to the respective head offsets determined during step 154. Using the data from Table 1, and rounding up, this would result in the following logical track zero assignments for the heads 112 in FIG. 4:

TABLE 2

| Head | Head to Disc Offset (Tracks) | Logical Track Zero (LTA(0)) |
|---|---|---|
| 0 | 0 | PTA = 50 |
| 1 | +1.5 | 52 |
| 2 | −1.5 | 48 |
| 3 | −0.5 | 49 |
| 4 | +2.5 | 53 |
| 5 | +1.5 | 52 |

From Table 2 it can be observed that a command by the interface circuit 138 (FIG. 2) to move head 0 to logical track zero on the associated surface 148 would result in the servo circuit 142 moving head 0 to physical track 50 (PTA(50)). However, a command to move head 1 to logical track zero on the associated surface 148 would result in the servo circuit 142 moving head 1 to physical track 52 (PTA(52)).

In both cases, the actuator 110 is nominally placed in the same angular position with respect to the disc stack, so that when a head switch is subsequently made (either from head 0 to head 1 or vice versa), the newly selected head will be substantially over logical track 0 on the corresponding surface. In other words, with reference again to FIG. 4, logical cylinder 0 is formed from the tracks adjacent each of the heads 0–5, even though these respective tracks will tend to have different physical track addresses.

Once logical track address M (in this case 0) is assigned on each data recording surface, remaining logical track addresses M=1 . . . p (where p>1) are assigned to remaining, adjacent tracks on the respective surfaces. For example, if a total of exactly 60,000 tracks are used to store user data on each data recording surface 148, and assuming no intermediate tracks are skipped (for media errors and the like), the data region for the data surface of head 0 would extend from PTA(50) to PTA(60,049), the data region for head 1 would extend from PTA(52) to PTA(60,051), and so on.

Continuing with step 158 of FIG. 5, the DSP 144 generates and stores an appropriate LTA-PTA conversion table for each head 0–5 for future use during data access operations. The routine then ends at step 160.

The second, alternative path of the routine 150 of FIG. 5 passes from step 154 to step 162. The head 112 having the largest head to disc offset is selected during this step. Using the offsets of Table 1, head 4 (having a head to disc offset of +2.5 tracks) would be selected during step 162. Logical track zero (LTA(0)) for the selected head 112 (in this case head 4) is assigned to the selected location PTA(N) at step 164, and the remaining logical track zero values are assigned to the remaining heads (0–3, 5) in relation to the head offsets at step 158, as before. This would result in the following LTA assignments:

TABLE 3

| Head | Head to Disc Offset (Tracks) | Logical Track Zero (LTA(0)) |
|---|---|---|
| 0 | 0 | PTA = 47 |
| 1 | +1.5 | 49 |
| 2 | −1.5 | 46 |
| 3 | −0.5 | 47 |
| 4 | +2.5 | 50 |
| 5 | +1.5 | 49 |

It will be noted that in this latter approach the selected head 112 having the largest offset is aligned with the desired reference physical track location (i.e., PTA(50)), and the remaining heads 112 are advanced or retracted from this location accordingly. The particular manner in which LTA values are assigned will depend upon the requirements of a given application.

Figure 6:
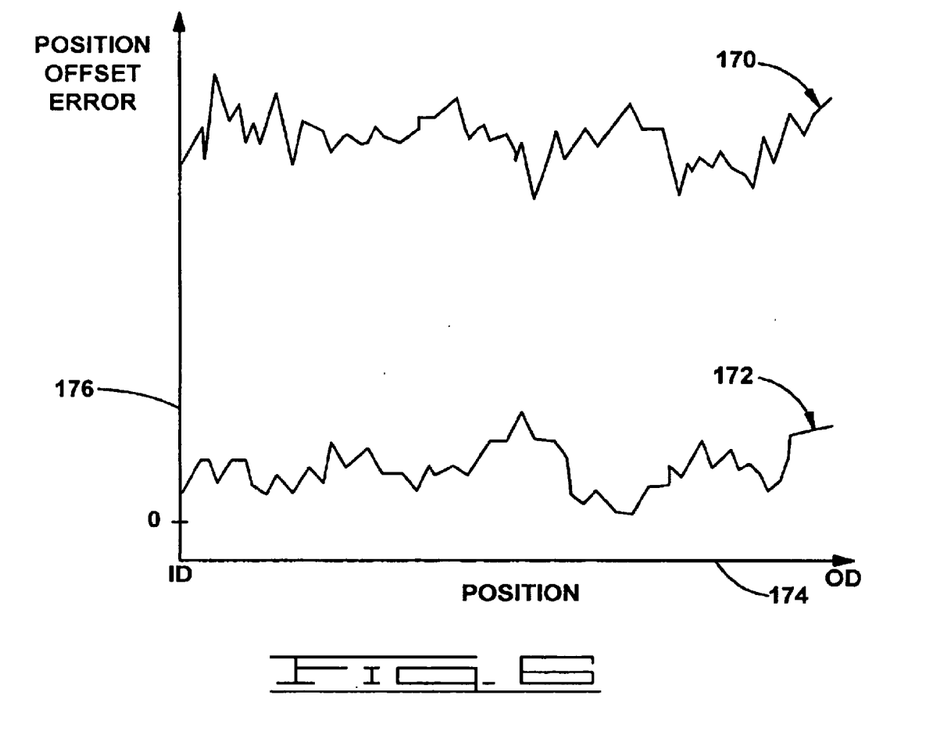
FIG. 6 is a graphical representation of position offset error versus recording surface position (radius) to generally illustrate typical improvements achieved through use of the routine of FIG. 5.

FIG. 6 illustrates typical improvements in position offset error as a result of the use of the routine of FIG. 5 for a typical head 112. FIG. 6 provides a baseline curve 170 indicative of no adjustments in logical track addressing in relation to head offsets. In other words, curve 170 represents a prior art drive in which all of the logical track zero values are assigned to the same physical track values (e.g., LTA(0)=PTA(N) on each disc surface where N=50 or some other value). FIG. 6 further provides an offset adjustment curve 172 indicative of adjustments in the locations of the various logical track zeroes on the various disc surfaces using the routine of FIG. 5. The curves 170, 172 are plotted against a disc position x-axis 174 and a position offset error magnitude y-axis 176.

Generally, the data in FIG. 6 indicate the extent to which corrections in placement of the head 112 are required after a head switch operation to position the newly selected head over the desired track. From FIG. 6 it will be observed that significant reductions in position error can be realized by adjusting the locations of the logical track zeroes in relation to head offsets in the manner set forth by FIG. 5.

It will now be understood that the present invention (as embodied herein and as claimed below) is generally directed to an apparatus and method for improving data transfer rate performance of a data handling system. In accordance with preferred embodiments, a disc drive (such as 100) is provided with a plurality of transducing heads (such as 112) adjacent a corresponding plurality of data recording surfaces (such as 148) on which concentric tracks (such as 120) are defined. Each track on each data recording surface is provided with a unique physical track address determined by servo data written to each said track (such as in GC field 132).

Logical track addresses are assigned by positioning a first head adjacent a selected location of the data recording surface corresponding to the first head (such as by step 152). A head offset value is measured for each of the remaining heads indicative of a radial distance between each said remaining head and the selected location while nominally maintaining the first head adjacent the selected location (such as by step 154). Logical track addresses are thereafter assigned to the tracks on each data recording surface in relation to the measured head offset values (such as by steps 156, 158 and 164). In this way, at least two tracks in at least one logical cylinder will have different physical track addresses.

In a preferred embodiment, a logical track address M is assigned to a corresponding track at the selected location of the data recording surface corresponding to the first head (such as by step 156), after which logical track addresses M are respectively assigned to corresponding tracks on each of the remaining data recording surfaces in relation to the measured head offset values (such as by step 158).

Alternatively, a selected head having the largest measured offset value is identified (such as by step 162), after which a logical track M is assigned to the track on the data recording surface corresponding to the selected head at a radius nominally that of the selected location (such as by step 164). Logical track addresses M are thereafter assigned to a track on each of the remaining data recording surfaces in relation to the head offset values (such as by step 158).

In accordance with other preferred embodiments, a data handling system (such as 100) is provided with a plurality of data recording surfaces (such as 148) each having a plurality of concentric tracks (such as 120), each track on each data recording surface having a physical track address defined by servo data written to each said track (such as by GC field 132). All of the tracks on the data recording surfaces having the same physical track address form a physical cylinder.

A plurality of transducing heads (such as 112) are provided adjacent a respective one of the plurality of data recording surfaces, wherein the heads are respectively, radially offset with respect to the data recording surfaces (such as illustrated by FIG. 4). A communication channel (such as R/W channel 140) operates to transfer data between the data recording surfaces and a host device, and an interface circuit (such as 138) directs the transfer of said data, with the interface circuit identifying each track on each data recording surface by a logical track address. A servo control circuit (such as 142) selectively positions the heads at desired locations adjacent the respective data recording surfaces.

During a host data access operation the interface circuit directs the servo control circuit to move a selected head to a selected logical track address. The servo control circuit converts the logical track address to a corresponding physical track address and uses the servo data to move the selected head to the associated track having the corresponding physical track address. The servo control circuit operates to assign logical track addresses to the tracks on the respective data recording surfaces in relation to the head offsets so that all of the tracks on the data recording surfaces having the same logical track address form a logical cylinder, and wherein at least two of the tracks in at least one logical cylinder have different physical track addresses.

In accordance with a further preferred embodiment, the servo control circuit operates to assign the logical track addresses by positioning a first head adjacent a selected location of the data recording surface corresponding to the first head (such as by step 152). A head offset value is measured for each of the remaining heads indicative of a radial distance between each said remaining head and the selected location while nominally maintaining the first head adjacent the selected location (such as by step 154). Logical track addresses are thereafter assigned to the tracks on each data recording surface in relation to the measured head offset values (such as by steps 156, 158 and 164).

For purposes of the appended claims, it will be understood that the recited function of the "first means" is carried out by the servo processor 144 in accordance with associated programming to perform the routine 150 of FIG. 5 (either or both paths). Equivalent structures include hardwired circuits configured to carry out the routine of FIG. 5 and other programmable processor devices specially configured to carry out the routine of FIG. 5 (either or both alternative paths).

It will be noted that prior art systems that fail to assign logical track addresses by measuring head offsets and then assigning logical track addresses in relation to the head offsets as set forth by FIG. 5 are excluded from the scope of the "first means" element, and are further explicitly excluded from the definition of an equivalent.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the logical track zero adaptation routine while maintaining the same functionality without departing from the spirit and scope of the invention.

In addition, although the embodiments described herein are generally directed to a logical track zero adaptation routine for a disc drive, it will be appreciated by those skilled in the art that the routine can be used for other types of data handling systems, such as optical disc systems, without departing from the spirit and scope of the claimed invention.

What is claimed is:

1. A method comprising steps of:
   (a) positioning a first transducing head relative to a selected reference location of a data recording surface corresponding to the first head;
   (b) measuring a head offset value for each of a number of remaining heads adjacent corresponding recording surfaces indicative of a radial distance between each said remaining head and the selected reference location while nominally maintaining the first head relative to the selected reference location; and
   (c) assigning logical track addresses to the tracks on each data recording surface in relation to the measured head offset values.

2. The method of claim 1, wherein all of the tracks on the data recording surfaces having the same physical track address form a physical cylinder, wherein all of the tracks on the data recording surfaces having the same logical track address upon operation of assigning step (c) form a logical cylinder, and wherein at least two of the tracks in at least one logical cylinder have different physical track addresses.

3. The method of claim 2, wherein at least two of the tracks in each logical cylinder have different physical track addresses.

4. The method of claim 1, wherein assigning step (c) comprises steps of:
   (c1) assigning a logical track address M to a corresponding track at the selected reference location of the data recording surface corresponding to the first head; and
   (c2) respectively assigning a logical track address M to a corresponding track on each of the remaining data recording surfaces in relation to the measured head offset values.

5. The method of claim 4, wherein M=0, and wherein logical track addresses of M=1 . . . p where p>1 are assigned to remaining, adjacent tracks on each of the data recording surfaces.

6. The method of claim 1, wherein assigning step (c) comprises steps of:
   (c1) identifying a selected head having the largest measured head offset value;
   (c2) assigning a logical track address M to a corresponding track on the data recording surface corresponding to the selected head at a radius nominally that of the selected reference location; and
   (c3) respectively assigning a logical track address M to a corresponding track on each of the remaining data recording surfaces in relation to the measured head offset values.

7. The method of claim 6, wherein M=0, and wherein logical track addresses of M=1 . . . p where p>1 are assigned to remaining, adjacent tracks on each of the data recording surfaces.

8. The method of claim 1, wherein the physical track addresses are expressed in relation to Gray code stored in servo data fields on each track.

9. An apparatus comprising:
a plurality of data recording surfaces each having a plurality of concentric tracks, each track on each data recording surface having a physical track address defined by servo data written to each said track, wherein all of the tracks on the data recording surfaces having the same physical track address form a physical cylinder;
a plurality of transducing heads each adjacent a respective one of the plurality of data recording surfaces, wherein the heads are respectively, radially offset with respect to the data recording surfaces, and wherein the tracks are further assigned logical track addresses in relation to the head offsets so that all of the tracks on the data recording surfaces having the same logical track address form a logical cylinder, with at least two of the tracks in at least one logical cylinder having different physical track addresses.

10. The data handling system of claim 9, further comprising a circuit which operates to assign the logical track addresses by steps comprising:
(a) positioning a first head relative to a selected reference location of the data recording surface corresponding to the first head;
(b) measuring a head offset value for each of the remaining heads indicative of a radial distance between each said remaining head and the selected reference location while nominally maintaining the first head relative to the selected reference location; and
(c) assigning the logical track addresses to the tracks on each data recording surface in relation to the measured head offset values.

11. The data handling system of claim 10, wherein assigning step (c) comprises steps of:
(c1) assigning a logical track address M to a corresponding track at the selected reference location of the data recording surface corresponding to the first head; and
(c2) respectively assigning a logical track address M to a corresponding track on each of the remaining data recording surfaces in relation to the measured head offset values.

12. The data handling system of claim 11, wherein M=0, and wherein logical track addresses of M=1 . . . p where p>1 are assigned to remaining, adjacent tracks on each of the data recording surfaces.

13. The data handling system of claim 10, wherein assigning step (c) comprises steps of:
(c1) identifying a selected head having the largest measured head offset value;
(c2) assigning a logical track address M to a corresponding track on the data recording surface corresponding to the selected head at a radius nominally that of the selected reference location; and
(c3) respectively assigning a logical track address M to a corresponding track on each of the remaining data recording surfaces in relation to the measured head offset values.

14. The data handling system of claim 13, wherein M=0, and wherein logical track addresses of M=1 . . . p where p>1 are assigned to remaining, adjacent tracks on each of the data recording surfaces.

15. The data handling system of claim 9, wherein the physical track addresses are expressed in relation to Gray code stored in servo data fields on each track.

16. An apparatus comprising:
a plurality of data recording surfaces each having a plurality of concentric tracks, each track on each data recording surface having a physical track address defined by servo data written to each said track, wherein all of the tracks on the data recording surfaces having the same physical track address form a physical cylinder;
a plurality of transducing heads each adjacent a respective one of the plurality of data recording surfaces; and
first means for assigning logical track addresses to the tracks in relation to radial offsets of the heads.

* * * * *